(12) United States Patent
Urisaka

(10) Patent No.: US 10,582,174 B2
(45) Date of Patent: Mar. 3, 2020

(54) VIDEO PROCESSING APPARATUS, VIDEO PROCESSING METHOD, AND MEDIUM

(71) Applicant: CANON KABUSHIKI KAISHA, Tokyo (JP)

(72) Inventor: Shinya Urisaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 271 days.

(21) Appl. No.: 15/335,131

(22) Filed: Oct. 26, 2016

(65) Prior Publication Data

US 2017/0127034 A1    May 4, 2017

(30) Foreign Application Priority Data

Oct. 30, 2015    (JP) ................................. 2015-214554

(51) Int. Cl.
*H04N 9/69* (2006.01)

(52) U.S. Cl.
CPC ..................................... *H04N 9/69* (2013.01)

(58) Field of Classification Search
CPC ................. H04N 9/69; H04N 5/202
See application file for complete search history.

(56) References Cited

U.S. PATENT DOCUMENTS

| 8,483,507 | B2 | 7/2013 | Kubota | |
|---|---|---|---|---|
| 2003/0151565 | A1* | 8/2003 | Kim | G09G 3/2022 345/60 |
| 2004/0066388 | A1* | 4/2004 | Leather | G06T 5/009 345/611 |
| 2005/0104987 | A1* | 5/2005 | Asada | H04N 5/202 348/333.01 |
| 2007/0196023 | A1* | 8/2007 | Hama | H04N 1/41 382/232 |
| 2009/0290045 | A1* | 11/2009 | Fukuda | H04N 5/20 348/231.99 |
| 2010/0177126 | A1* | 7/2010 | Inoue | H04N 5/202 345/690 |
| 2010/0208105 | A1* | 8/2010 | Kubota | H04N 5/23219 348/234 |
| 2014/0327695 | A1* | 11/2014 | Suzuki | G09G 5/06 345/601 |
| 2015/0281664 | A1 | 10/2015 | Tada | |
| 2016/0165256 | A1* | 6/2016 | Van Der Vleuten | H04N 5/2355 375/240.01 |

(Continued)

FOREIGN PATENT DOCUMENTS

| CN | 101322416 A | 12/2008 |
|---|---|---|
| CN | 104869370 A | 8/2015 |

(Continued)

*Primary Examiner* — Jason A Flohre
(74) *Attorney, Agent, or Firm* — Canon U.S.A., Inc. IP Division

(57) ABSTRACT

A camera microcomputer sets a gamma characteristic that suits a luminance input value/output value relationship in the entire luminance region extending from lower luminance to higher luminance of a video signal to a luminance input value/output value relationship of a referential gamma characteristic, irrespective of input dynamic range. A gamma correction processing unit performs gamma correction processing on a captured video signal in such a way as to convert the input value into the output value based on the set gamma characteristic.

8 Claims, 10 Drawing Sheets

(56) References Cited

U.S. PATENT DOCUMENTS

2018/0109850 A1* 4/2018 Tsukagoshi ............ H04N 5/278

FOREIGN PATENT DOCUMENTS

| | | |
|---|---|---|
| CN | 104954771 A | 9/2015 |
| JP | 2002-033956 A | 1/2002 |
| JP | 2002-223373 A | 8/2002 |
| JP | 2010-193098 A | 9/2010 |
| JP | 2015-162712 A | 9/2015 |
| KR | 10-2007-0012668 A | 1/2007 |
| KR | 10-2010-0029212 A | 3/2010 |
| WO | 2014/002901 A1 | 1/2014 |
| WO | 2016/181819 A1 | 11/2016 |

* cited by examiner

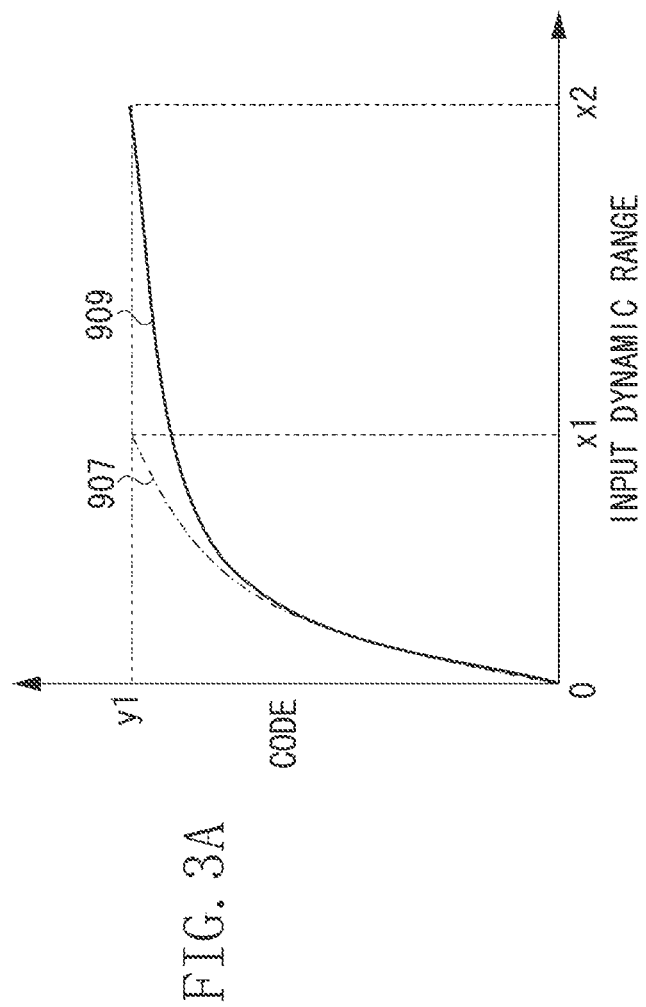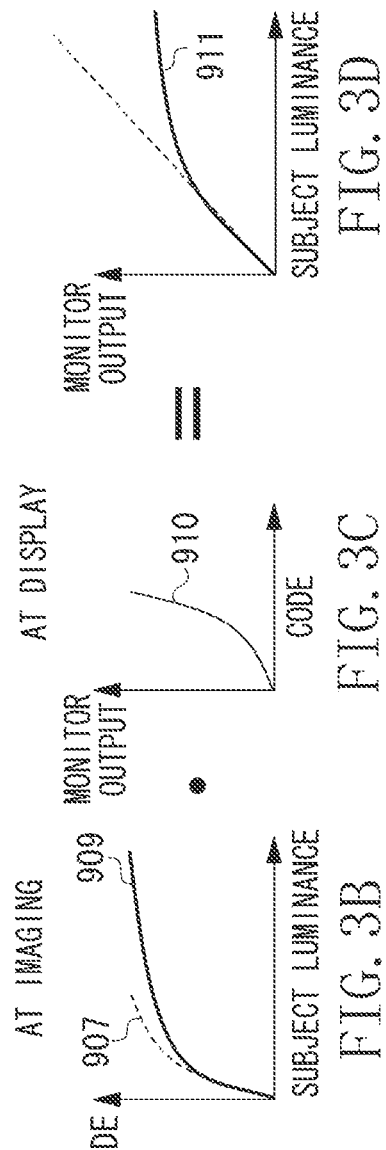

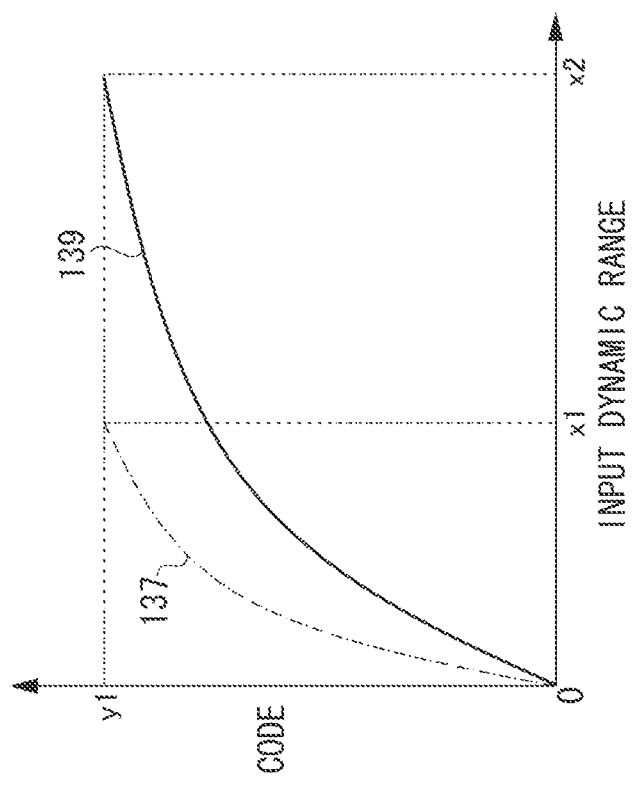
FIG. 4A
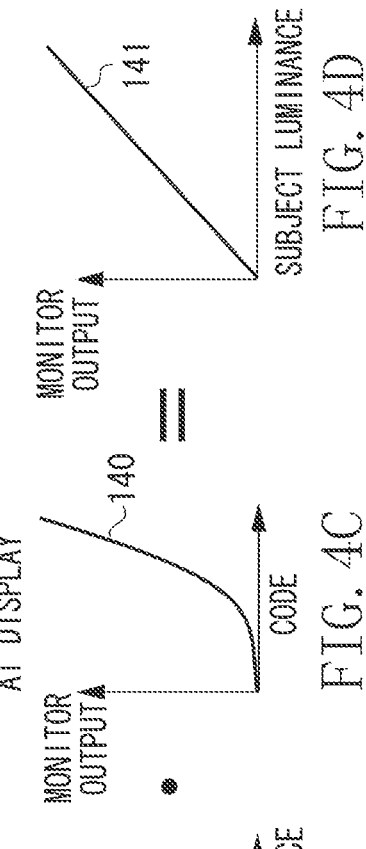
FIG. 4B
FIG. 4C
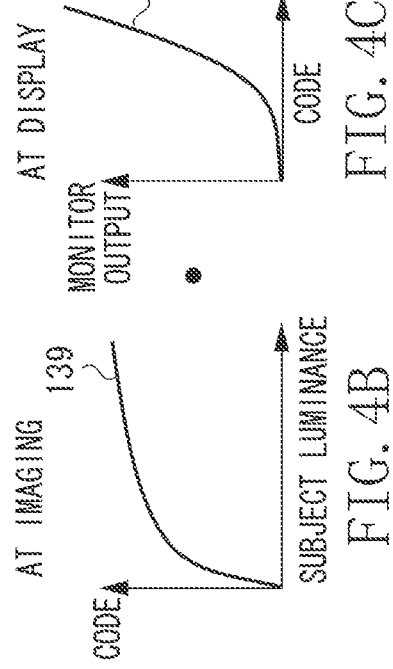
FIG. 4D

VIDEO PROCESSING APPARATUS, VIDEO PROCESSING METHOD, AND MEDIUM

BACKGROUND OF THE INVENTION

Field of the Invention

The present invention relates to a video processing apparatus, a video processing method, and a medium.

Description of the Related Art

In a conventional video processing system including an imaging apparatus capable of sequentially capturing images of a subject and a display apparatus capable of displaying a video, both of the imaging apparatus and the display apparatus perform gradation correction processing based on gamma correction. The gradation correction processing (i.e., gamma correction processing) performed by the imaging apparatus includes converting a luminance input code value of a captured video signal into an output code value corresponding to a gamma characteristic of the imaging apparatus (i.e., a camera gamma). The gradation correction processing (i.e., gamma correction processing) performed by the display apparatus includes converting a luminance input code value of a supplied video signal into a luminance value based on a gamma characteristic of the display apparatus (i.e., a display gamma). Thus, only a limited part of the brightness of a subject having a very wide dynamic range in the real world can be segmented. It is possible to realize a satisfactory display in a definite narrow dynamic range of a monitor unit of the display apparatus.

Further, as a gradation correction processing technique capable of securing a practical input dynamic range for the imaging apparatus, a conventional technique discussed in Japanese Patent Application Laid-Open No. 2002-223373 widens the input dynamic range by performing gamma correction processing including knee correction.

The above-mentioned gamma correction processing including the knee correction is determined by compressing the contrast in both a middle-luminance region and a high-luminance region while securing the practical input dynamic range. However, compressing the contrast in the middle-luminance and high-luminance regions can result in, for example, unnaturalness, in a gradation characteristic of the entire system including the imaging apparatus and the display apparatus because the contrast in the high-luminance region is relatively compressed compared to the low-luminance region. More specifically, a gradation characteristic of a video displayed by the display apparatus can result in luminance change reduced in the high-luminance region, compared to a gradation characteristic of a real subject. Thus, the video displayed by the display apparatus is unnatural in that natural gradation, color, and sharpness of the real subject cannot be reproduced.

Meanwhile, there is a conventional gradation correction processing technique applicable to the display apparatus, which is capable of compensating the compressed contrast in the high-luminance region by increasing the brightness of the high-luminance region. However, the video signal output from the imaging apparatus does not include gradation information about the middle-luminance and high-luminance regions. Thus, the gradation cannot be sufficiently restored by only the processing performed by the display apparatus. Further, since the display apparatus cannot obtain information about the gamma characteristic of the imaging apparatus, it is difficult for the display apparatus to reproduce the natural gradation, color, and sharpness of the real subject.

SUMMARY OF THE INVENTION

According to exemplary embodiments, a video processing apparatus includes a control unit configured to set a gamma characteristic generated for a second dynamic range larger than a first dynamic range, based on a referential gamma characteristic in which a relationship between a luminance input value and a luminance output value is predetermined in the entire luminance range of the first dynamic range, without changing the relationship, and a correction unit configured to perform gamma correction processing on a video signal having the second dynamic range by using the set gamma characteristic.

Further features of the present invention will become apparent from the following description of exemplary embodiments with reference to the attached drawings.

BRIEF DESCRIPTION OF THE DRAWINGS

FIGS. 3A, 3B, 3C, and 3D illustrate gamma correction processing in an ordinary imaging mode.

FIGS. 4A, 4B, 4C, and 4D illustrate gamma correction processing in a high-luminance priority mode.

DESCRIPTION OF THE EMBODIMENTS

Hereinafter, an exemplary embodiment of the present invention will be described in detail below with reference to the attached drawings.

<Configuration of Imaging Apparatus>

Figure 1:
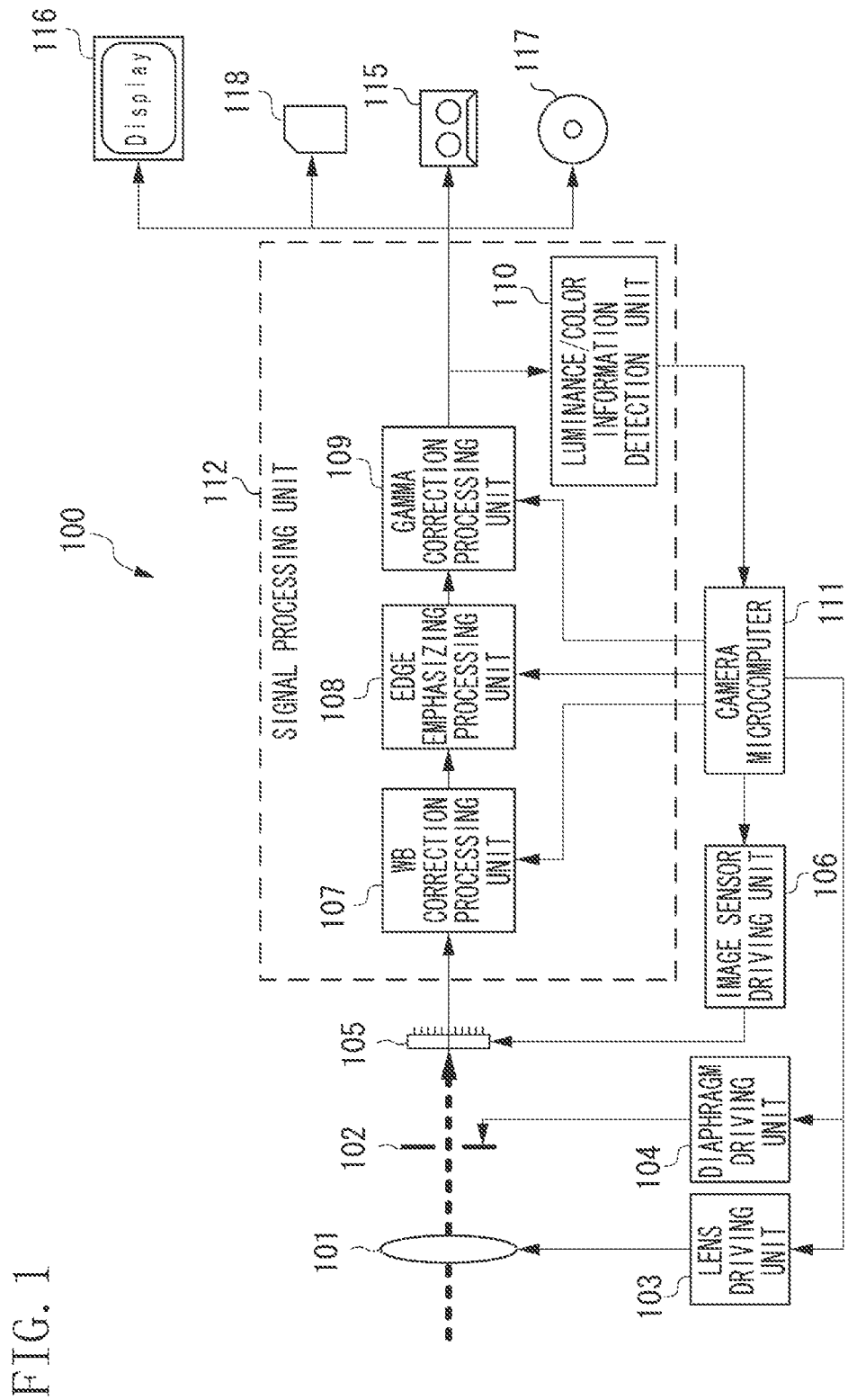
FIG. 1 is a block diagram illustrating a schematic configuration of an imaging apparatus according to an exemplary embodiment.

FIG. 1 is a block diagram illustrating a schematic configuration of an imaging apparatus 100, as an example of a video processing apparatus according to the present exemplary embodiment.

A lens 101 forms a subject image on an imaging plane of an image sensor 105. A diaphragm 102 adjusts a quantity of light entering via the lens 101. The image sensor 105 converts the subject image formed on the imaging plane via the lens 101 and the diaphragm 102 into a video signal. Although not illustrated, an analog/digital (A/D) converter is provided to process the video signal output from the image sensor 105. Then, the A/D converter obtains a digital video signal by coding an analog video signal through A/D conversion and transmits the digital video signal to a signal processing unit 112. The lens 101 may has a lens shift type camera-shake correction function capable of causing an optical system dedicated to camera-shake correction to shift in an optical axis thereof. Further, the camera-shake correction function may be a sensor shift type correction that changes the position of the image sensor 105 relative to the optical axis of the lens 101 or may be a reading control type correction that performs camera-shake correction by controlling reading from the image sensor 105.

The signal processing unit 112 includes a white balance (WB) correction processing unit 107, an edge emphasizing processing unit 108, a gamma (γ) correction processing unit 109, and a luminance/color information detection unit 110. The WB correction processing unit 107 performs white balance correction processing on the video signal transmitted from the image sensor 105. The edge emphasizing processing unit 108 performs edge emphasizing processing on the video signal having been subjected to the WB correction processing. The gamma correction processing unit 109 performs gamma correction processing based on a gamma characteristic (i.e., camera gamma) of the imaging apparatus. The gamma correction processing will be described in detail below. The luminance/color information detection unit 110 included in the signal processing unit 112 divides one frame image of the video signal into horizontal direction components and vertical direction components to set a plurality of luminance/color information detection frames (hereinafter, simply referred to as "detection frames"). The luminance/color information detection unit 110 performs processing for integrating pixel values in respective detection frames and detects luminance information and color information of each detection frame of the subject image. The luminance/color information detection unit 110 transmits the luminance information and the color information of each detection frame detected by the luminance/color information detection unit 110 to a camera microcomputer 111. Although the signal processing unit 112 performs various processing, other than the WB correction processing, the edge emphasizing processing, the gamma correction processing, and the luminance/color information detection processing, description thereof is omitted. The signal processing unit 112 outputs the video signal having been subjected to various signal processing to a display device 116. The display device 116 displays a video based on the received signal. Further, the signal processing unit 112 can record the processed video signal to a computer readable storage medium, such as a magnetic tape 115, a digital versatile disk (DVD) disk 117, or a memory card 118.

The camera microcomputer 111, which is an example of a control unit provided in the imaging apparatus 100, calculates respective correction values to be used in the WB correction processing, the edge emphasizing processing, and the gamma correction processing based on subject information, such as the luminance information and the color information detected by the luminance/color information detection unit 110. Then, the camera microcomputer 111 transmits a correction value to be used in the WB correction processing to the WB correction processing unit 107. The camera microcomputer 111 transmits a correction value to be used in the edge emphasizing processing to the edge emphasizing processing unit 108. The camera microcomputer 111 transmits a correction value to be used in the gamma correction processing (e.g., a later-described gamma correction curve of the gamma characteristic) to the gamma correction processing unit 109. In this way, the WB correction processing unit 107, the edge emphasizing processing unit 108, and the gamma correction processing unit 109 perform individual processing based on the supplied correction values, respectively. The camera microcomputer 111 causes an image sensor driving unit 106 to perform a control to store electric charges in the image sensor 105 and read the stored electric charges. The camera microcomputer 111 causes a lens driving unit 103 to perform a control to realize focusing and zooming operations of the lens 101. The camera microcomputer 111 can perform an exposure control based on the luminance information and the color information by causing a diaphragm driving unit 104 to control the diaphragm 102 and causing the image sensor driving unit 106 to control the shutter speed of the image sensor 105. Further, the camera microcomputer 111 can perform a camera-shake correction control if the imaging apparatus 100 possesses an appropriate (e.g., lens shift type, sensor shift type, or reading control type) camera-shake correction function.

<Configuration of Video Camera>

Figure 2:
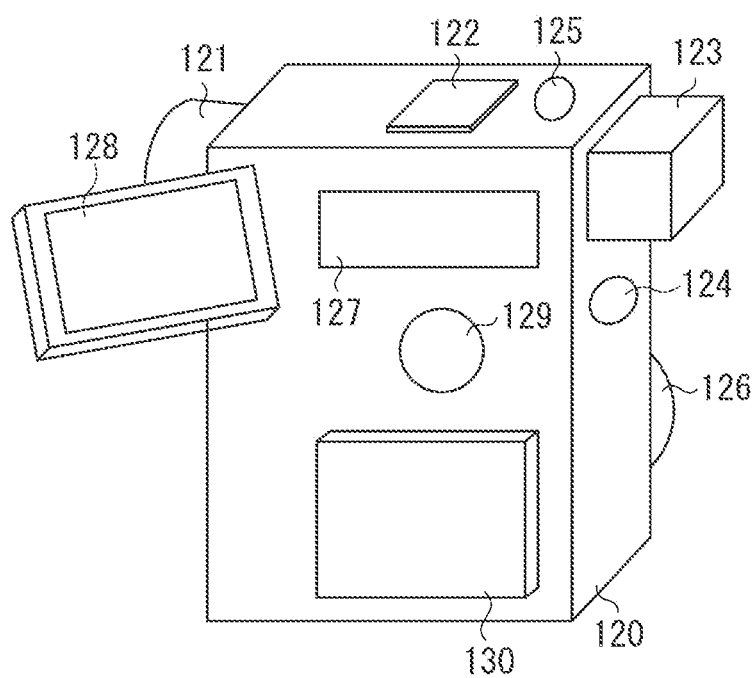
FIG. 2 is a perspective view illustrating an overview of the imaging apparatus.

FIG. 2 is a perspective view illustrating an overview of a video camera 120, which includes the imaging apparatus 100 integrated with the display device 116 according to the present exemplary embodiment, as an example of a video processing system.

The DVD disk 117, the magnetic tape 115, and the memory card 118 are accommodated in the video camera 120, so that video signals and still images can be recorded and reproduced. A lens unit 121 includes the lens 101 and the diaphragm 102 illustrated in FIG. 1. A microphone 122 is equipped to collect sounds during an image capturing operation. An electronic view finder (EVF) 123 is equipped to enable a user to confirm a captured subject or display a reproduction image. A moving image trigger switch 124 is, for example, a push button, which is operable when a user transmits a moving image capturing start instruction or a moving image capturing stop instruction to the device. A still image trigger switch 125 is, for example, a push button, which is operable when a user transmits a still image capturing start instruction or a still image capturing stop instruction to the device. A mode dial 126 is a rotary switch having a plurality of modes, including "reproduction" (i.e., a mode selectable when a user sets a reproduction mode), "camera" (i.e., a mode selectable when a user sets a camera mode), "ordinary imaging" (i.e., a mode selectable when a user sets an ordinary imaging mode), "high-luminance priority" (i.e., a mode selectable when a user sets a high-luminance priority mode), and "OFF" selectable when a user does not set the above-mentioned modes. An operation switch group 127 includes an appropriate number of operation switches operable when a user operates the video camera 120, a mode key operable to input an image-quality filter mode, a menu key operable to perform a menu operation, and a reproduction key operable to perform a reproduction operation. A liquid crystal panel 128 is flexibly connected to the video camera 120 so that the liquid crystal panel 128 can be opened or closed relative to a side surface of the camera body. The liquid crystal panel 128 is rotatable in the horizontal direction. Similar to the EVF 123, the liquid crystal panel 128 can be used to confirm a captured subject or display a reproduction image. In the exemplary state illustrated in FIG. 2, the liquid crystal panel 128 is opened relative to the body of the video camera 120. The display device 116 illustrated in FIG. 1 can be used as the EVF 123 or the liquid crystal panel 128. A speaker 129 can output sounds and voices recorded together with a video when the video is reproduced. A battery 130 is a secondary battery, which can supply electric power to the video camera 120. The battery 130 is attachable to and detachable from the camera body. In this respect, the video camera 120 illustrated in FIG. 2 includes the configuration required to capture and record images of a subject, which corresponds to the imaging apparatus 100 according to the present exemplary embodiment. Further, the video camera 120 includes the configuration required to reproduce captured video signals and recorded video signals to display images on the liquid crystal panel 128, which corresponds to the display apparatus according to the present exemplary embodiment.

<High-Luminance Priority Mode and Ordinary Imaging Mode>

The imaging apparatus 100 according to the present exemplary embodiment includes, at least, the high-luminance priority mode and the ordinary imaging mode, as imaging modes, which are selectable in a video capturing operation. When the imaging mode is the high-luminance priority mode, the imaging apparatus 100 uses a high-luminance priority gamma correction curve as the gamma characteristic (i.e., camera gamma) in the gamma correction processing. On the other hand, when the imaging mode is the ordinary imaging mode, the imaging apparatus 100 uses an ordinary imaging gamma correction curve. Hereinafter, the gamma characteristics (i.e., gamma correction curves) to be used by the imaging apparatus 100 according to the present exemplary embodiment, in the gamma correction processing performed in the ordinary imaging mode and the high-luminance priority mode, will be described.

In the ordinary imaging mode, the imaging apparatus 100 performs gradation correction through the gamma correction processing including the knee correction, which can compress the contrast in both middle-luminance and high-luminance regions while securing a practical input dynamic range. In the present exemplary embodiment, compressing the contrast is equivalent to decreasing the gradient of the characteristic curve, which can be expressed by a change in luminance relative to a change in dynamic range.

Hereinafter, gradation correction characteristics in the ordinary imaging mode will be described in detail below with reference to FIGS. 3A to 3D. Each of FIG. 3A and FIG. 3B illustrates the gamma characteristic (i.e., camera gamma) of the imaging apparatus. FIG. 3C illustrates the gamma characteristic (i.e., display gamma) of the display apparatus. FIG. 3D illustrates a gradation characteristic of the entire video processing system constituted by the imaging apparatus and the display apparatus.

In FIGS. 3A and 3B, a gamma characteristic 907 is a gamma characteristic corresponding to an input dynamic range "x1", which is standardized according to ITU-R BT.709. Further, in FIGS. 3A and 3B, a gamma characteristic 909 is a gamma characteristic corresponding to a larger (widened) input dynamic range "x2" (which is a practical range). The gamma characteristic 909 is compressed in contrast compared to the gamma characteristic 907, in the middle-luminance and high-luminance regions. The gamma characteristic 909 can secure a satisfactory output (i.e., brightness) in the low-luminance and middle-luminance regions (i.e., a region where human visibility is higher) while expanding the input dynamic range. In the ordinary imaging mode, the data amount in the high-luminance region (i.e., a region where human visibility is lower) is smaller because a reduced allocation is applied to a code of luminance output value with respect to the number of bits.

When the imaging mode is the ordinary imaging mode, the gamma correction processing unit 109 of the imaging apparatus 100 performs gamma correction processing in such a way as to convert a code of luminance input value of the video signal into a code of output value corresponding to a gamma correction curve of the gamma characteristic 909. Hereinafter, the code of input value is referred to as "input code value" and the code of output value is referred to as "output code value." The video signal having been subjected to the gradation correction processing in the ordinary imaging mode can be, for example, recorded and then reproduced so that a reproduced video can be displayed on the monitor unit (e.g., the liquid crystal panel 128) of the display apparatus.

On the other hand, the gamma characteristic of the display apparatus is, for example, a gamma characteristic 910 illustrated in FIG. 3C. The display apparatus performs gamma correction processing for converting, for example, a luminance input code value of a recorded and then reproduced video signal into a luminance value corresponding to a gamma correction curve of the gamma characteristic 910 illustrated in FIG. 3C. The gamma characteristic 910 illustrated in FIG. 3C is a gamma characteristic corresponding to an inverse characteristic of the gamma characteristic 907, which is standardized according to ITU-R BT.709.

A gradation characteristic 911 illustrated in FIG. 3D indicates a gradation characteristic of the entire video processing system constituted by the imaging apparatus and the display apparatus, which is obtainable in this case. More specifically, the gradation characteristic 911 of the entire video processing system, which can be obtained when the imaging apparatus uses the gamma characteristic 909 and the display apparatus uses the gamma characteristic 910 to perform the gamma correction processing, is an unnatural gradation characteristic because the contrast in the high-luminance region is excessively compressed compared to the contrast in the low-luminance region. A video displayed by the monitor unit of the display apparatus becomes unnatural in this case, because the displayed video is defective in gradation, color, and sharpness of a real subject.

Hereinafter, gradation correction characteristics in the high-luminance priority mode will be described in detail below with reference to FIGS. 4A to 4D. Each of FIGS. 4A and 4B illustrates the gamma characteristic (i.e., camera gamma) of the imaging apparatus. FIG. 4C illustrates the gamma characteristic (i.e., display gamma) of the display apparatus. FIG. 4D illustrates a gradation characteristic of the entire video processing system constituted by the imaging apparatus and the display apparatus.

A gamma characteristic 137 illustrated in FIG. 4A is a gamma characteristic corresponding to the input dynamic range x1, which is standardized according to ITU-R BT.709, similar to the gamma characteristic 907 illustrated in FIG. 3A. On the other hand, in FIGS. 4A and 4B, a gamma characteristic 139 is a gamma characteristic corresponding to the larger (widened) input dynamic range x2 (i.e., the practical range). The gamma characteristic 139 is determined from the relationship between the input code and the output code can be maintained in the same condition as the gamma characteristic 137 and the bit allocation rate applied to the code values in a region extending from lower luminance to higher luminance is fixed (not changed).

The present exemplary embodiment uses a function $y=f(x)$ that can express the reference gamma characteristic 137 corresponding to the input dynamic range x1. The input dynamic range is widened "t" times. In this case, a function $y=f(x/t)$ can be used to express the gamma characteristic 139 of the high-luminance priority mode. Consequently, the dynamic range x1 of the gamma characteristic 139 of the high-luminance priority mode is larger by a factor of t than the dynamic range x2 of the reference gamma characteristic 137.

In the present exemplary embodiment, the input dynamic range can be set as an appropriate value for each product (the imaging apparatus) or can be set as an appropriate value for each imaging mode of the product. Further, the input dynamic range can be set adaptively, for example, for each imaging scene in the same imaging mode.

When the imaging mode is the high-luminance priority mode, the gamma correction processing unit 109 of the imaging apparatus 100 performs gamma correction processing for converting a luminance input code value of the video signal into a code value corresponding to a gamma correction curve of the gamma characteristic 139. The video signal having been subjected to the gradation correction processing in the high-luminance priority mode can be, for example, recorded and then reproduced so that a reproduced video can be displayed on the monitor unit (e.g., the liquid crystal panel 128) of the display apparatus according to the present exemplary embodiment.

As mentioned above, in the high-luminance priority mode, the imaging apparatus 100 performs gamma correction processing using the gamma characteristic 139 whose input code value/output code value relationship accords with the input code value/output code value relationship of the referential gamma characteristic 137, while expanding the input dynamic range in the entire luminance region extending from lower luminance to higher luminance. Further, in the high-luminance priority mode, the imaging apparatus 100 fixes (does not change) the bit allocation rate of the output code value in the entire luminance region extending from lower luminance to higher luminance. In the high-luminance priority mode, the imaging apparatus 100 performs gamma correction processing using the gamma characteristic 139 which is determined so that the input code value/output code value relationship can be maintained in the same condition as the gamma characteristic 137. Therefore, the contrast compression (performed in the ordinary imaging mode) is not performed in the high-luminance region.

On the other hand, the gamma characteristic of the display apparatus is a gamma characteristic 140 illustrated in FIG. 4C, which is similar to the above-mentioned gamma characteristic 910 illustrated in FIG. 3C. Accordingly, the display apparatus performs gamma correction processing for converting, for example, a luminance input code value of a recorded and then reproduced video signal into a luminance value, based on a gamma correction curve of the gamma characteristic 140 illustrated in FIG. 4C.

A gradation characteristic 141 illustrated in FIG. 4D indicates a gradation characteristic of the entire video processing system constituted by the imaging apparatus and the display apparatus, which is obtainable in this case. More specifically, the gradation characteristic 141 of the entire video processing system, which can be obtained when the imaging apparatus has performed the gamma correction processing based on the gamma characteristic 139, is a linear characteristic in the entire luminance region extending from the low-luminance region to the high-luminance region. Accordingly, when the imaging apparatus is operating in the high-luminance priority mode, the video processing system can realize a linear gradation characteristic, such as the gradation characteristic 141 illustrated in FIG. 4D. A reproduced video displayed on the monitor unit of the display apparatus becomes natural in gradation, color, and sharpness of a real subject.

<Gradation Correction Processing by Imaging Apparatus>

Figure 5:
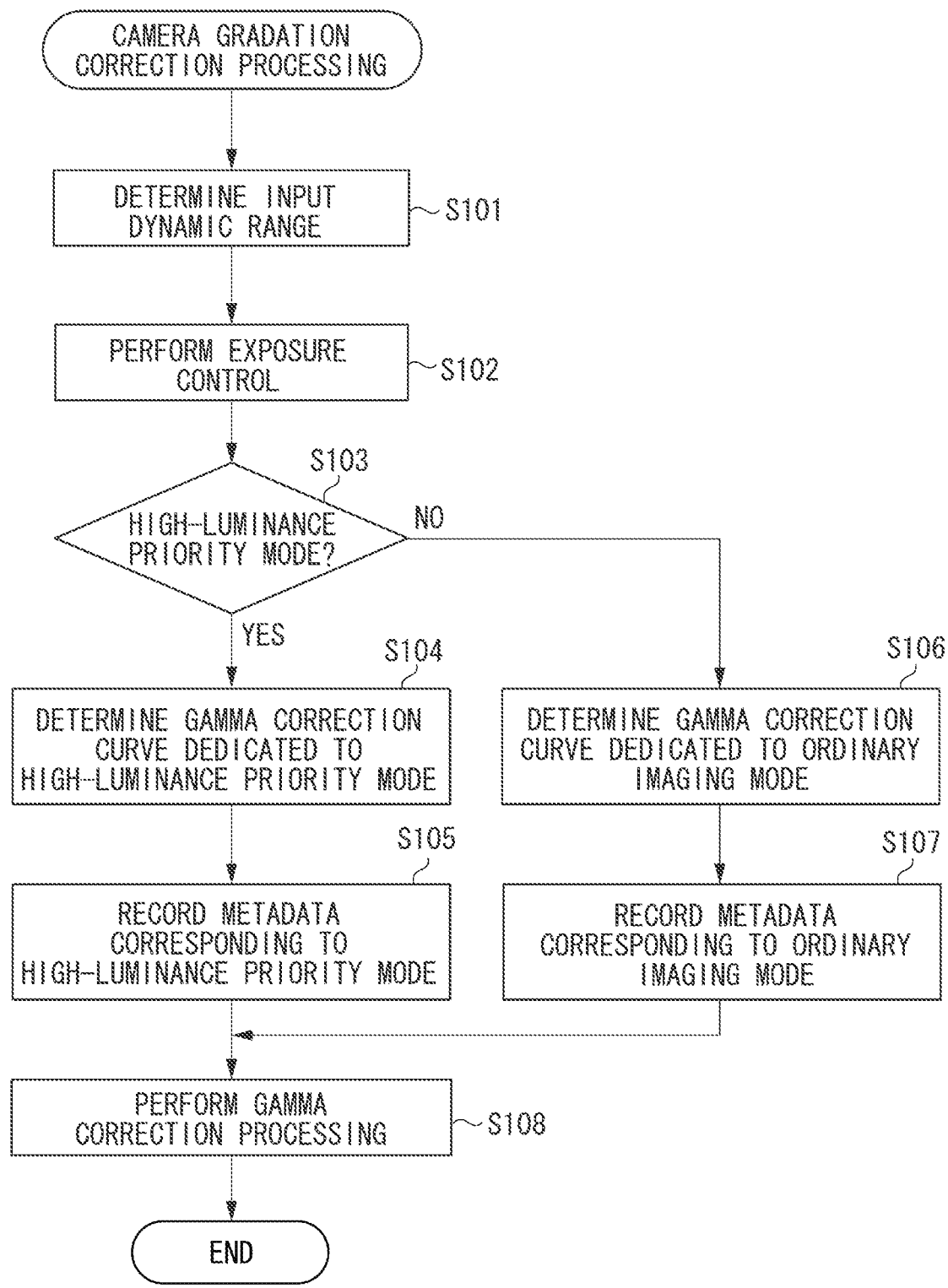
FIG. 5 is a flowchart illustrating a gradation correction processing control performed by the imaging apparatus.

FIG. 5 is a flowchart illustrating a flow of processing performed by the camera microcomputer 111, including input dynamic range determination, gamma correction curve determination, metadata recording, and gamma correction processing control, when the imaging apparatus 100 according to the present exemplary embodiment performs an imaging operation and then performs gradation correction processing.

Each process of the flowchart illustrated in FIG. 5 is implemented by the camera microcomputer 111 executing a video processing program dedicated to the imaging apparatus according to the present exemplary embodiment. The video processing program according to the present exemplary embodiment can be prepared beforehand in a read only memory (ROM) (not illustrated) of the imaging apparatus 100 or can be read from an external storage medium (not illustrated) and loaded into a random access memory (RAM) (not illustrated) of the imaging apparatus. As another exemplary embodiment, the video processing program can be downloaded into the imaging apparatus 100 via an appropriate network (e.g., internet).

The gradation correction processing of the flowchart illustrated in FIG. 5 starts, for example, when a user operates the moving image trigger switch 124 or the still image trigger switch 125 to start an image or video capturing operation. If the imaging apparatus 100 starts the gradation correction processing, then in step S101, the camera microcomputer 111 determines the input dynamic range. The input dynamic range determined in this case is a predetermined value having been set beforehand according to the imaging mode or a value calculated based on luminance information and color information detected by the luminance/color information detection unit 110. After completing the processing in step S101, the operation of the camera microcomputer 111 proceeds to step S102.

In step S102, the camera microcomputer 111 performs an exposure control, which includes controlling the above-mentioned diaphragm 102 and controlling the shutter speed of the image sensor 105, based on the luminance information and the color information detected by the luminance/color information detection unit 110. After completing the processing in step S102, the operation of the camera microcomputer 111 proceeds to step S103.

In step S103, the camera microcomputer 111 determines whether the present imaging mode is the high-luminance priority mode. In the present exemplary embodiment, a user can operate the mode dial 126 to select or switch the imaging mode between the high-luminance priority mode and the ordinary imaging mode. If the camera microcomputer 111 determines that the present imaging mode is the high-luminance priority mode (YES in step S103), the operation proceeds to step S104. If the camera microcomputer 111 determines that the present imaging mode is not the high-luminance priority mode (i.e., if the camera microcomputer 111 determines that the present imaging mode is the ordinary imaging mode) (NO in step S103), the operation proceeds to step S106.

In step S104, the camera microcomputer 111 determines the gamma correction curve of the above-mentioned gamma characteristic 139 dedicated to the high-luminance priority mode as the gamma characteristic to be used by the gamma correction processing unit 109 in the gamma correction processing. After completing the processing in step S104, the operation of the camera microcomputer 111 proceeds to step S105.

In step S105, the camera microcomputer 111 generates metadata to be described later that corresponds to the high-luminance priority mode and adds the generated metadata to the video signal. For example, a latter part of the gamma correction processing unit 109 performs the above-mentioned processing for adding the metadata, although an exemplary configuration for adding the metadata to the video signal is not illustrated. The metadata associated with the video signal is then recorded in the magnetic tape 115, the DVD disk 117, or the memory card 118. After completing the processing in step S105, the operation of the camera microcomputer 111 proceeds to step S108.

The metadata is, for example, a flag indicating the high-luminance priority mode, information indicating the input dynamic range, magnification relative to the display luminance reference value and peak luminance value having been set beforehand for the display apparatus, gamma shape information and base gamma about the imaging apparatus. The information indicating the input dynamic range can be used when the display apparatus calculates an appropriate brightness (peak luminance value). The magnification relative to the display luminance reference value is information corresponding to "t" (in a case where the referential input dynamic range x1 is widened "t" times) in determining the above-mentioned gamma characteristic 139 defined by the function y=f(x/t) in the high-luminance priority mode. When the referential input dynamic range x1 is widened "t" times in the high-luminance priority mode, it is desired that the display luminance of the display apparatus is increased "t" times. Therefore, the information about the magnification is prepared as one of the metadata. Further, the peak luminance value is calculated by the imaging apparatus 100 with reference to a peak luminance value determined, as a standard for the display apparatus, according to ITU-R BT.709. The imaging apparatus 100 calculates an appropriate peak luminance value for the display apparatus according to the input dynamic range and adds the calculated peak luminance value, as one of the metadata. The gamma shape information is information indicating a gamma value representing the shape of the gamma correction curve. The gamma shape information in the high-luminance priority mode is information representing the shape of the above-mentioned gamma characteristic 139. The gamma shape information in the ordinary imaging mode is information representing the shape of the above-mentioned gamma characteristic 909. The base gamma is information indicating the above-mentioned gamma characteristic 137 standardized according to ITU-R BT.709.

On the other hand, when the operation proceeds to step S106, the camera microcomputer 111 determines the gamma correction curve of the above-mentioned gamma characteristic 909 dedicated to the ordinary imaging mode as the gamma characteristic to be used by the gamma correction processing unit 109 in the gamma correction processing. After completing the processing in step S106, the operation of the camera microcomputer 111 proceeds to step S107.

In step S107, the camera microcomputer 111 adds metadata corresponding to the ordinary imaging mode to the video signal. The metadata in this case is a flag indicating the ordinary imaging mode, information indicating the input dynamic range, magnification relative to the display luminance reference value and peak luminance value having been set beforehand for the display apparatus, gamma shape information about the imaging apparatus, and base gamma of the imaging apparatus. As described above, the latter part of the gamma correction processing unit 109 performs the above-mentioned processing for adding the metadata (although not illustrated). The metadata associated with the video signal is then recorded in the magnetic tape 115, the DVD disk 117, or the memory card 118. After completing the processing in step S107, the operation of the camera microcomputer 111 proceeds to step S108.

In step S108, the camera microcomputer 111 causes the gamma correction processing unit 109 to perform the gamma correction processing with reference to the gamma correction curve determined in step S104 or step S106. After completing the gamma correction processing in step S108, the camera microcomputer 111 repeats the above-mentioned processing of the flowchart illustrated in FIG. 5 until the power supply to the imaging apparatus 100 is stopped.

<Display Example of Appropriate Exposure Control by Imaging Apparatus>

Figure 6:
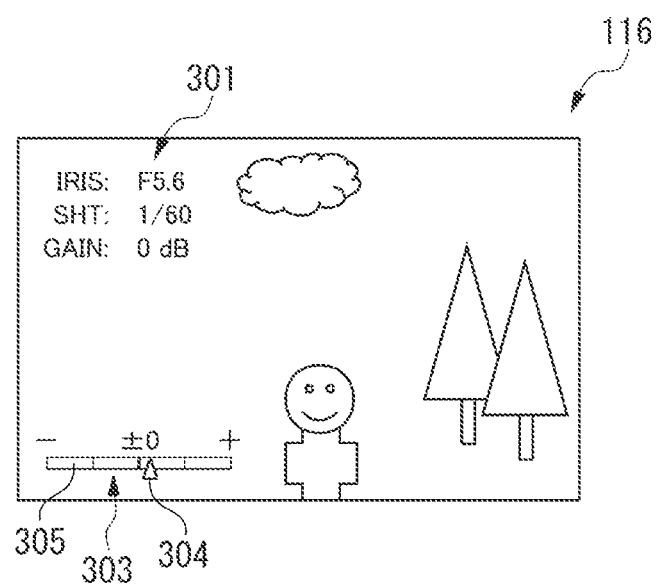
FIG. 6 is a schematic view illustrating an exemplary exposure display control performed by the imaging apparatus.

Hereinafter, an example of an appropriate exposure display, which can be performed when the display device 116 (e.g., the EVF 123 or the liquid crystal panel 128) performs a live view display (or a through video display) of a video captured by the imaging apparatus 100 in the high-luminance priority mode, will be described in detail below with reference to FIG. 6. FIG. 6 illustrates an example of the live view video displayed by the display device 116 (e.g., the EVF 123 or the liquid crystal panel 128) when the imaging mode is the high-luminance priority mode.

When an imaging operation is performed, the camera microcomputer 111 generates an exposure display signal to display a relationship between present exposure and appropriate exposure corresponding to the present values with respect to diaphragm, shutter speed, and gain, in an exposure information display area 301 on the screen of the display device 116, as illustrated in FIG. 6. Thus, numerical values indicating the diaphragm, the shutter speed, and the gain are displayed in the exposure information display area 301 on the screen of the display device 116. Further, the camera microcomputer 111 updates the contents displayed in the exposure information display area 301 if the diaphragm value, the shutter speed, or the gain value is changed by a user operation. For example, an exposure bar 305 indicating an "under (−)" or "over (+)" state relative to the appropriate exposure (±0) and an exposure mark 304 indicating the present exposure amount are displayed in an exposure display area 303. A user can confirm the "under" or "over" degree of the present exposure relative to the appropriate exposure (±0) by checking the position of the exposure mark 304 on the exposure bar 305.

The gamma characteristic 139 in the high-luminance priority mode according to the present exemplary embodiment is a relatively dark gamma characteristic, compared to the gamma characteristic 909 of the ordinary imaging mode. Therefore, when the imaging mode is the high-luminance priority mode, the camera microcomputer 111 displays the display position of the appropriate exposure (±0) in the exposure display area 303 in such a way as to shift it to a position corresponding to the gamma characteristic 139. Thus, even when a video displayed in the high-luminance priority mode is relatively dark compared to that in the ordinary imaging mode, a user can determine whether the present exposure is appropriate (=±0) by confirming the display of the exposure display area 303.

As mentioned above, according to the present exemplary embodiment, in a case where the imaging apparatus 100 is operating in the high-luminance priority mode, the video processing system can realize the linear gradation characteristic, such as the gradation characteristic 141 illustrated in FIG. 4D. Accordingly, a reproduced video displayed on the monitor unit of the display apparatus becomes natural in gradation, color, and sharpness of a real subject in the entire luminance region extending from a dark portion (i.e., a low luminance region) to a highlight portion (i.e., a high-luminance region). In particular, when the imaging apparatus 100 is operating in the high-luminance priority mode, the display apparatus can display a video that is excellent, for example, in shine of metal, transparency of water, solidity of blue sky and cloud, gradation of skin tone, color reproducibility, and sharpness.

<Configuration of Video Processing System>

Figure 7:
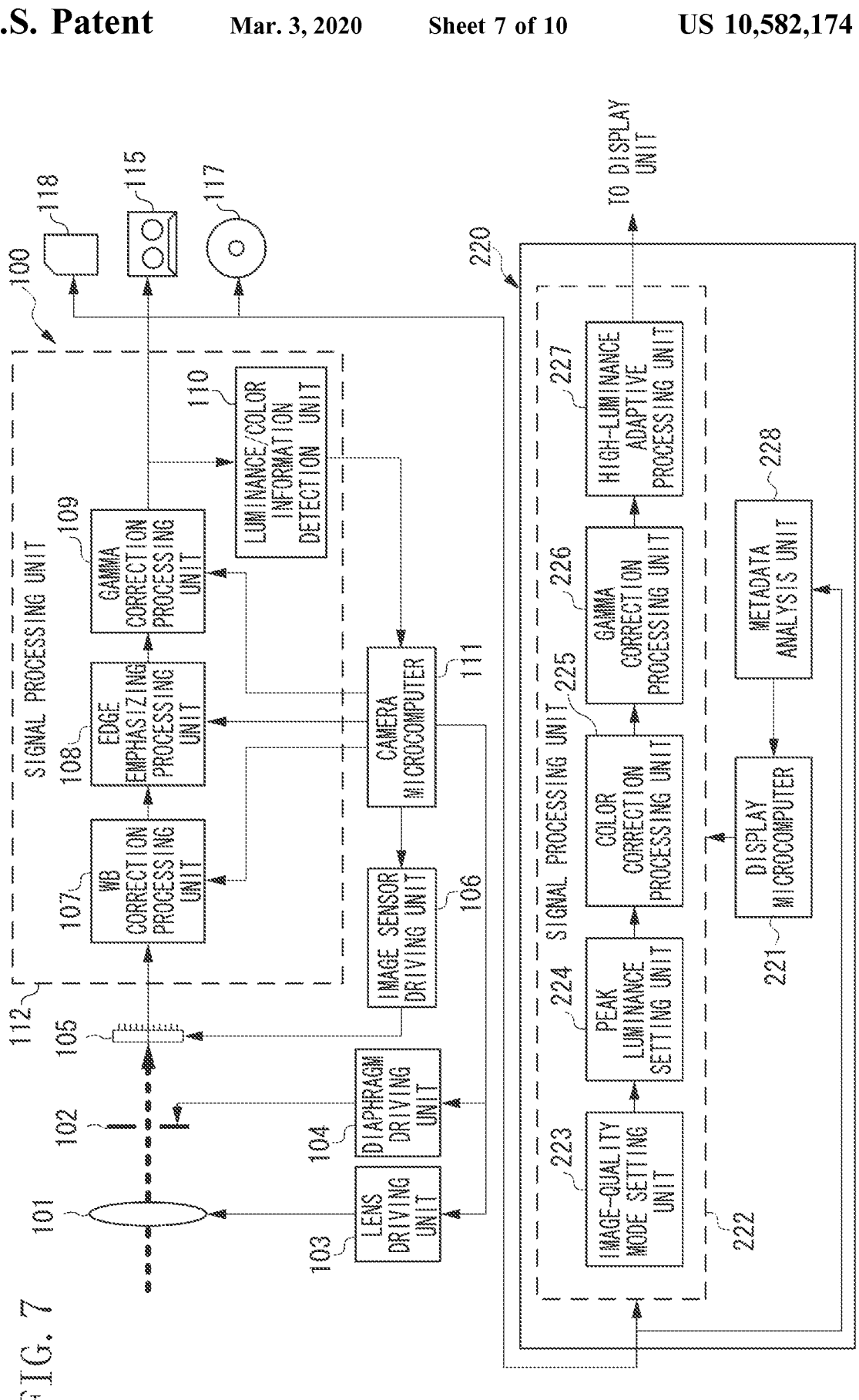
FIG. 7 is a block diagram illustrating a schematic configuration of a video processing system according to the exemplary embodiment.

FIG. 7 is a block diagram illustrating a schematic configuration of a video processing system, which includes the above-mentioned imaging apparatus 100 according to the present exemplary embodiment (see FIG. 1) and a display apparatus 220, which is an example of the video processing apparatus according to the present exemplary embodiment.

The imaging apparatus 100 illustrated in FIG. 7 includes constituent components similar to the lens 101 to the DVD disk 117 illustrated in FIG. 1, except for the display device 116 illustrated in FIG. 1. Therefore, redundant description thereof will be avoided. Further, the imaging apparatus 100 illustrated in FIG. 7 is similar to the imaging apparatus 100 illustrated in FIG. 1 in gamma characteristics in the ordinary imaging mode and the high-luminance priority mode as well as in gamma correction processing (i.e., gradation correction processing) and therefore redundant description thereof will be avoided. The signal processing unit 112 can record the processed video signal to a computer readable storage medium, such as the magnetic tape 115, the digital versatile disk (DVD) disk 117, or the memory card 118.

In the video processing system illustrated in FIG. 7, the display apparatus 220 receives a video signal having been subjected to the signal processing from the signal processing unit 112 of the imaging apparatus 100 or a video signal recorded on the magnetic tape 115, the DVD disk 117, or the memory card 118 and then reproduced. The display apparatus 220 transmits the input video signal to a metadata analysis unit 228 and a signal processing unit 222.

The metadata analysis unit 228 analyzes the above-mentioned metadata added to the input video signal and transmits metadata analysis result to a display microcomputer 221. More specifically, the metadata analysis unit 228 transmits the flag indicating the high-luminance priority mode, information indicating the input dynamic range, magnification relative to the display luminance reference value and peak luminance value, together with the gamma shape information and the base gamma information about the imaging apparatus to the display microcomputer 221. The metadata may not include all of the above-mentioned information, but the metadata analysis unit 228 transmits the entire information analyzed from the metadata to the display microcomputer 221. The display microcomputer 221 is an example of a control unit provided in the display apparatus 220. The display microcomputer 221 controls each signal process performed in the signal processing unit 222, based on the metadata analysis result.

The signal processing unit 222 according to the present exemplary embodiment includes at least a gamma correction processing unit 226. According to the example illustrated in FIG. 7, the signal processing unit 222 includes an image-quality mode setting unit 223, a peak luminance setting unit 224, a color correction processing unit 225, and a high-luminance adaptive processing unit 227, in addition to the gamma correction processing unit 226. The signal processing unit 222 may include all of the image-quality mode setting unit 223, the peak luminance setting unit 224, the color correction processing unit 225, and the high-luminance adaptive processing unit 227, or may include only one of them. The video signal having been subjected to the signal processing performed by the signal processing unit 222 can be transmitted to and displayed by a display device (i.e., the display device 116 illustrated in FIG. 1), although not illustrated in FIG. 7.

The image-quality mode setting unit 223 sets an image quality mode of the display apparatus 220. The display apparatus 220 can perform an appropriate display, for example, for each of various image quality modes, such as "entrustment", "standard", "vivid", "dynamic", "cinema", and "game" modes. The image-quality mode setting unit 223 performs settings for each image quality mode. For example, the image-quality mode setting unit 223 sets an image quality mode according to a user selection on an image-quality mode setting menu, or sets an image quality mode according to the high-luminance priority mode or the ordinary imaging mode used by the imaging apparatus 100. As an exemplary setting of the image quality mode, the image-quality mode setting unit 223 sets the image-quality mode "vivid" or "dynamic" when the used mode is the high-luminance priority mode and sets the image-quality mode "standard" when the used mode is the ordinary imaging mode.

The peak luminance setting unit 224 sets a peak luminance value when the display apparatus 220 displays a video on the display device (116). When the imaging apparatus 100 performs the gamma correction processing in the high-luminance priority mode, the peak luminance setting unit 224 performs processing for setting the peak luminance value of the video signal to an appropriate peak luminance value so that the brightness of the video in the low/middle-luminance region becomes equal to the corresponding brightness in the ordinary imaging mode. The peak luminance value to be set by the peak luminance setting unit 224 may be a regular peak luminance value determined beforehand. However, to reproduce the natural gradation of a real subject, it is desired to set the peak luminance value in such a manner that the brightness in the high-luminance priority mode becomes equal to the corresponding brightness in the ordinary imaging mode in the low/middle-luminance region. Further, when the imaging apparatus 100 performs the gradation correction processing in the ordinary imaging mode, the peak luminance setting unit 224 sets the peak luminance value of the video signal to a predetermined ordinary video-oriented peak luminance value. The peak luminance value setting processing will be described in detail below with reference to a flowchart illustrated in FIG. 8.

The color correction processing unit 225 performs color conversion processing and specific color correction processing on the video signal based on matrix calculation or lookup table, although details of the color conversion processing and the specific color correction processing are not described in detail below.

The gamma correction processing unit 226 performs gamma correction processing on the video signal. When the imaging apparatus 100 performs the gradation correction processing in the high-luminance priority mode, the gamma correction processing unit 226 performs gamma correction processing on the video signal with a gamma correction curve that is similar to an inverse characteristic of the gamma characteristic 139 used by the imaging apparatus 100 in the high-luminance priority mode. The gamma characteristic to be used by the gamma correction processing unit 226 may be a regular gamma characteristic standardized according to ITU-R BT.709. However, to reproduce the natural gradation of a real subject, it is desired to use the gamma characteristic corresponding to the inverse characteristic of the gamma characteristic 139 in the high-luminance priority mode. Further, when the imaging apparatus 100 performs the gradation correction processing in the ordinary imaging mode, the gamma correction processing unit 226 performs gamma correction processing on the video signal with a gamma correction curve that is similar to an inverse characteristic of the gamma characteristic 909 used by the imaging apparatus 100 in the ordinary imaging mode. The gamma correction processing will be described in detail below with reference to a flowchart illustrated in FIG. 9.

The high-luminance adaptive processing unit 227 performs adaptive processing on the video signal according to the imaging mode (i.e., the high-luminance priority mode or the ordinary imaging mode) of the imaging apparatus 100 having been set in the gradation correction processing. In the present exemplary embodiment, an example of the adaptive processing is dynamic range remaster processing in which the display apparatus 220 restores color information that suits the high-luminance region for the video signal whose contrast has been compressed in the high-luminance region through the gamma correction processing in the ordinary imaging mode. The dynamic range remaster processing is determined by expanding the color information in such a way as to suit an expansion rate of the luminance to be restored in a case where the high-luminance region entirely turns into white if the dynamic range is expanded in the high-luminance region. As an example of the adaptive processing, when the imaging apparatus 100 performs the gradation correction processing in the ordinary imaging mode, the high-luminance adaptive processing unit 227 performs the dynamic range remaster processing on the video signal in such a way as to restore the color information that suits the high-luminance region. On the other hand, when the imaging apparatus 100 performs the gradation correction processing in the high-luminance priority mode, the high-luminance adaptive processing unit 227 does not perform the dynamic range remaster processing on the video signal.

<Peak Luminance Value Setting Processing by Display Apparatus>

Figure 8:
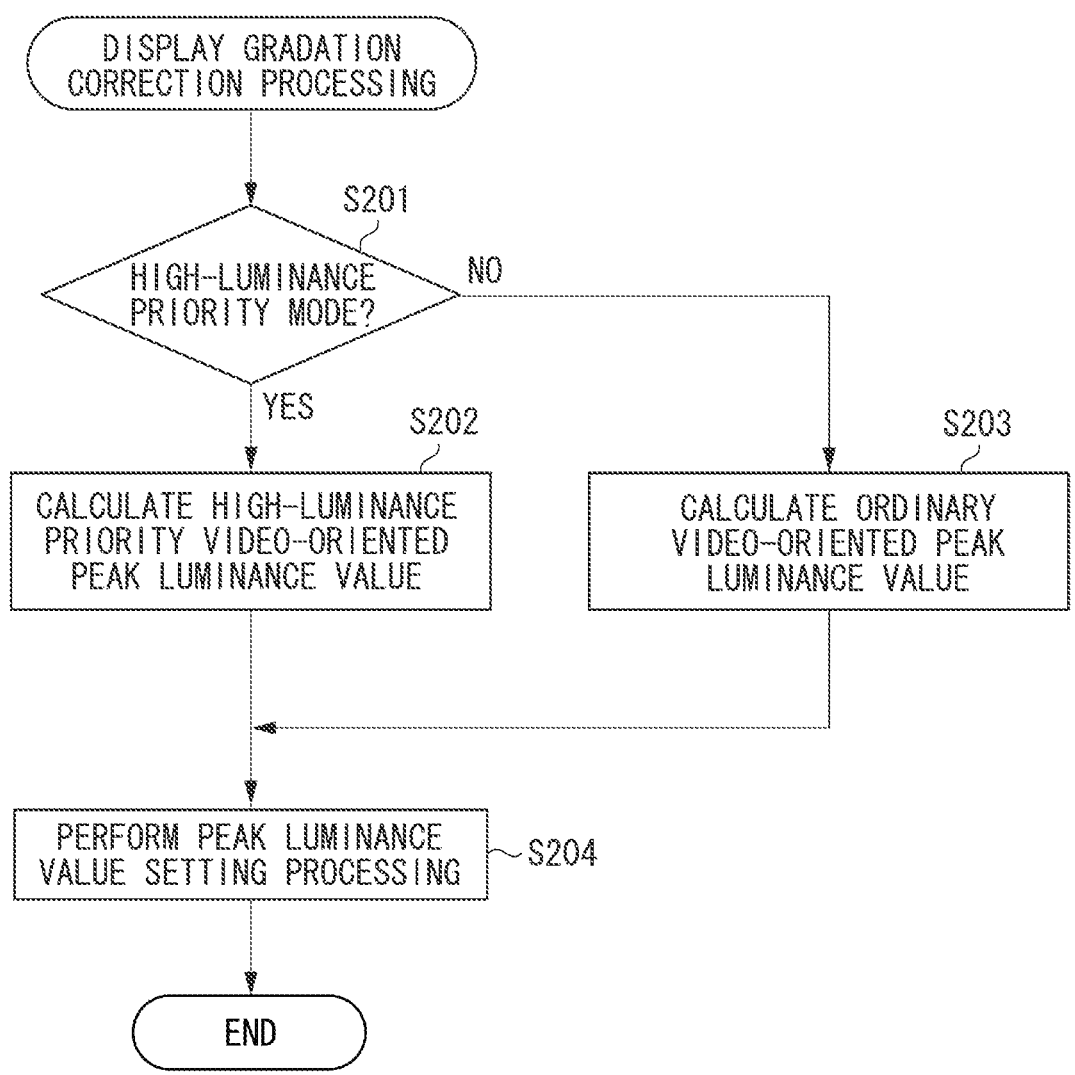
FIG. 8 is a flowchart illustrating a peak luminance value setting processing control performed by a display apparatus.

FIG. 8 is a flowchart illustrating exemplary processing performed by the display apparatus 220 to set the brightness of a display video with a peak luminance value that reflects the difference in imaging mode (i.e., the high-luminance priority mode or the ordinary imaging mode) when the video signal is subjected to the gradation correction processing in the imaging apparatus 100. In the present exemplary embodiment, the display apparatus 220 may be configured to perform only one or both of the processing illustrated in FIG. 8 and the processing illustrated in FIG. 9. Further, the display apparatus 220 may perform processing of a flowchart illustrated in FIG. 10. Therefore, in the present exemplary embodiment, each of the flowcharts illustrated in FIGS. 8 to 10 will be described independently.

Each process of the flowchart illustrated in FIG. 8 is implemented by the display microcomputer 221 executing a video processing program dedicated to the display apparatus according to the present exemplary embodiment. The video processing program according to the present exemplary embodiment may be prepared beforehand in a ROM (not illustrated) of the display apparatus 220 or may be read from an external storage medium (not illustrated) and loaded into a RAM (not illustrated) of the display apparatus 220. As another exemplary embodiment, the video processing program may be downloaded into the display apparatus 220 via an appropriate network (e.g., internet).

The processing of the flowchart illustrated in FIG. 8 starts, for example, when a user operates the mode dial 126 of the video camera 120 illustrated in FIG. 2 to select the reproduction mode and operates the operation switch group 127 to start reproduction. If the processing of the flowchart illustrated in FIG. 8 starts, then in step S201, the display microcomputer 221 determines whether the video signal is a signal having been subjected to the gradation correction processing in the high-luminance priority mode with reference to the flag indicating the high-luminance priority mode (i.e., the metadata analysis result) or a user operation. If the display microcomputer 221 determines that the high-luminance priority mode flag is present (YES in step S201), the operation proceeds to step S202. On the other hand, if the display microcomputer 221 determines that the high-luminance priority mode flag is not present, namely, when the video signal is the signal having been subjected to the gradation correction processing in the ordinary imaging mode (NO in step S201), the operation proceeds to step S203.

When the operation proceeds to step S202, the display microcomputer 221 calculates a peak luminance value that equalizes the brightness of the video in a low/middle-luminance region with the corresponding brightness in the ordinary imaging mode. The display microcomputer 221 refers to the above-mentioned input dynamic range, the magnification relative to the display luminance reference value, or the peak luminance value (i.e., a part of the metadata) in calculating the peak luminance value that equalizes the brightness of the video in the low/middle-luminance region with the corresponding brightness in the ordinary imaging mode.

The input dynamic range is the metadata to be used when the camera microcomputer 111 of the imaging apparatus 100 calculates the peak luminance value, as mentioned above. Thus, the display microcomputer 221 of the display apparatus 220 can obtain the peak luminance value from the input dynamic range, similar to the processing performed by the camera microcomputer 111. Further, the magnification relative to the display luminance reference value is the metadata indicating a value calculated by the camera microcomputer 111 of the imaging apparatus 100 as display luminance magnification that is appropriate for the display apparatus when the imaging mode is the high-luminance priority mode, as mentioned above. Thus, the display microcomputer 221 of the display apparatus 220 can obtain a display luminance (i.e., a peak luminance value) that is appropriate for the video signal subjected to the gradation correction processing in the high-luminance priority mode, from the magnification relative to the display luminance reference value, in a manner opposite to that in the camera microcomputer 111. Further, the peak luminance value is the metadata indicating a value calculated by the camera microcomputer 111 of the imaging apparatus 100 with reference to a standard peak luminance value determined for the display apparatus, which is standardized according to ITU-R BT.709, as mentioned above. Thus, the display microcomputer 221 of the display apparatus 220 can obtain an appropriate peak luminance value for the video signal subjected to the gradation correction processing in the high-luminance priority mode, with reference to the peak luminance value included in the metadata. As another exemplary embodiment, the display microcomputer 221 may use a predetermined high-luminance priority video-oriented peak luminance value in step S202, instead of referring to the metadata. After completing the processing in step S202, the operation of the display microcomputer 221 proceeds to step S204.

On the other hand, when the operation proceeds to step S203, the display microcomputer 221 calculates a predetermined ordinary video-oriented peak luminance value, although processing for calculating the predetermined ordinary video-oriented peak luminance value is not described. After completing the processing in step S202, the operation of the display microcomputer 221 proceeds to step S204.

When the operation proceeds to step S204, the display microcomputer 221 causes the peak luminance setting unit 224 to perform peak luminance value setting processing for the display device (116) based on the peak luminance value determined in step S202 or step S203. Thus, when the imaging apparatus 100 performs the gradation correction processing in the high-luminance priority mode, the peak luminance setting unit 224 performs peak luminance value setting processing on the video signal in such a manner that the brightness of the video in the low/middle-luminance region becomes equal to the corresponding brightness in the ordinary imaging mode. On the other hand, when the imaging apparatus 100 performs the gradation correction processing in the ordinary imaging mode, the peak luminance setting unit 224 performs ordinary imaging mode video-oriented peak luminance value setting processing on the video signal. After completing the processing in step S204, the display microcomputer 221 repeats the processing of the flowchart illustrated in FIG. 8 until the power supply to the display apparatus 220 is stopped.

The display apparatus 220 according to the present exemplary embodiment performs the peak luminance value setting processing for the display device (116) in conjunction with the gradation correction processing performed by the imaging apparatus 100 in the high-luminance priority mode or the ordinary imaging mode. When the imaging apparatus 100 has performed the gradation correction processing in the high-luminance priority mode, the display apparatus 220 equalizes the brightness of the gradation correction processed video signal in the low/middle luminance region with the corresponding brightness in the ordinary imaging mode. Thus, the display apparatus 220 can prevent the display video in the low/middle luminance region from being darkened when the imaging apparatus 100 has performed the gradation correction processing in the high-luminance priority mode. Further, in the present exemplary embodiment, by setting the peak luminance value in such a way as to compensate the brightness in the low/middle luminance region when the imaging apparatus 100 performs the gradation correction processing in the high-luminance priority mode, it is feasible to keep balance between the image quality in the high-luminance region having been improved by selecting the high-luminance priority mode and the image quality in the low/middle luminance.

<Gamma Correction Processing by Display Apparatus>

Figure 9:
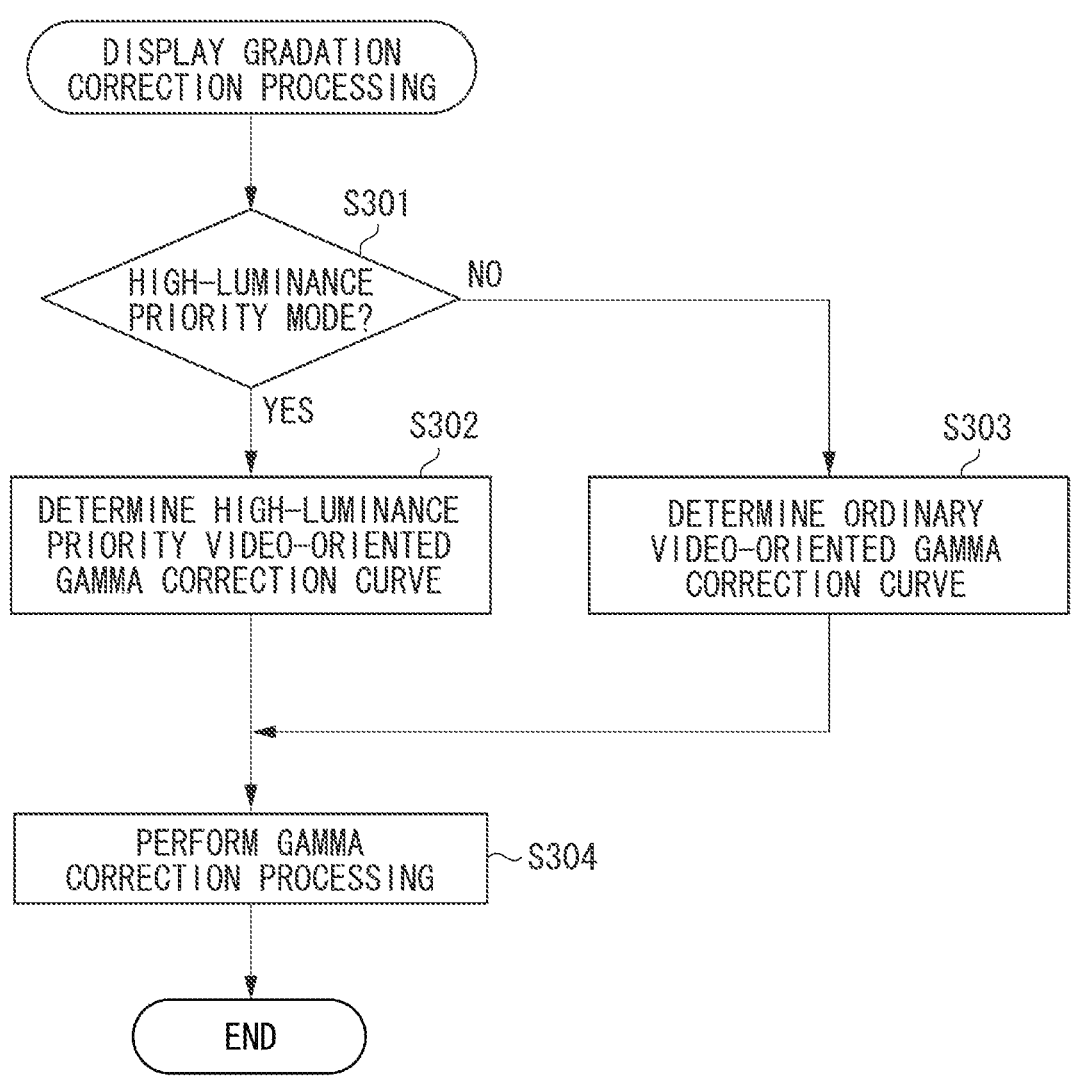
FIG. 9 is a flowchart illustrating a gamma correction processing control performed by the display apparatus.

FIG. 9 is a flowchart illustrating exemplary processing performed by the display apparatus 220 to perform gamma correction processing on a display video signal with a gamma correction curve that reflects the difference in imaging mode (i.e., the high-luminance priority mode or the ordinary imaging mode) when the video signal has been subjected to the gradation correction processing in the imaging apparatus 100.

Each process of the flowchart illustrated in FIG. 9 is implemented by the display microcomputer 221 executing a video processing program dedicated to the display apparatus according to the present exemplary embodiment. The video processing program according to the present exemplary embodiment may be prepared beforehand in the ROM (not illustrated) of the display apparatus 220 or may be read from an external storage medium (not illustrated) and loaded into the RAM (not illustrated) of the display apparatus 220. As another exemplary embodiment, the video processing program may be downloaded into the display apparatus 220 via an appropriate network (e.g., internet).

The processing of the flowchart illustrated in FIG. 9 starts, for example, when a user operates the mode dial 126 of the video camera 120 illustrated in FIG. 2 to select the reproduction mode and operates the operation switch group 127 to start reproduction. If the processing of the flowchart illustrated in FIG. 9 starts, then in step S301, the display microcomputer 221 determines whether the video signal is a signal having been subjected to the gradation correction processing in the high-luminance priority mode with reference to the flag indicating the high-luminance priority mode (i.e., the metadata analysis result) or a user operation. If the display microcomputer 221 determines that the high-luminance priority mode flag is present (YES in step S301), the operation proceeds to step S302. On the other hand, if the display microcomputer 221 determines that the high-luminance priority mode flag is not present, namely, when the video signal is the signal having been subjected to the gradation correction processing in the ordinary imaging mode, (NO in step S301), the operation proceeds to step S303.

When the operation proceeds to step S302, the display microcomputer 221 determines a gamma correction curve based on metadata gamma shape information and base gamma information in such a way as to bring the gamma characteristic of the display apparatus 220 most close to an inverse characteristic of the gamma characteristic of the imaging apparatus 100. As another exemplary embodiment, the display microcomputer 221 may be configured to use a predetermined high-luminance priority video-oriented gamma correction curve, instead of using the metadata gamma shape information and the base gamma information, in step S302. After completing the processing in step S302, the operation of the display microcomputer 221 proceeds to step S304.

On the other hand, when the operation proceeds to step S303, the display microcomputer 221 determines a predetermined ordinary video-oriented gamma correction curve. After completing the processing in step S302, the operation of the display microcomputer 221 proceeds to step S304.

In step S304, the display microcomputer 221 causes the gamma correction processing unit 226 to perform gamma correction processing based on the gamma correction curve determined in step S302 or step S303. Thus, when the imaging apparatus 100 performs the gradation correction processing in the high-luminance priority mode, the gamma correction processing unit 226 performs gamma correction processing on the video signal with the gamma correction curve that is similar to the inverse characteristic of the gamma characteristic in the high-luminance priority mode. On the other hand, when the imaging apparatus 100 performs the gradation correction processing in the ordinary imaging mode, the gamma correction processing unit 226 performs gamma correction processing on the video signal with the gamma correction curve that is similar to the inverse characteristic of the gamma characteristic in the ordinary imaging mode. After completing the processing in step S304, the display microcomputer 221 repeats the processing of the flowchart illustrated in FIG. 9 until the power supply to the display apparatus 220 is stopped.

The display apparatus 220 according to the present exemplary embodiment performs gamma correction processing with the gamma correction curve that is similar to the inverse characteristic of the gamma characteristic used by the imaging apparatus 100 to perform the gamma correction processing in the high-luminance priority mode or the ordinary imaging mode. The display apparatus 220 can improve the gradation characteristic of the entire video processing system in linearity accuracy, by switching the gamma characteristic to be used in the gamma correction processing according to the imaging mode (i.e., the high-luminance priority mode or the ordinary imaging mode) having been set in the imaging apparatus 100. For example, when the imaging apparatus 100 has performed the gradation correction processing in the high-luminance priority mode, the contrast compression (performed in the ordinary imaging mode) is not performed even if the input dynamic range is expanded, and adequate luminance linearity in the gradation characteristic of the entire video processing system can be obtained. Thus, it becomes feasible to realize natural gradation in the entire region extending from the dark portion to the highlight portion.

<Signal Processing by Display Apparatus>

Figure 10:
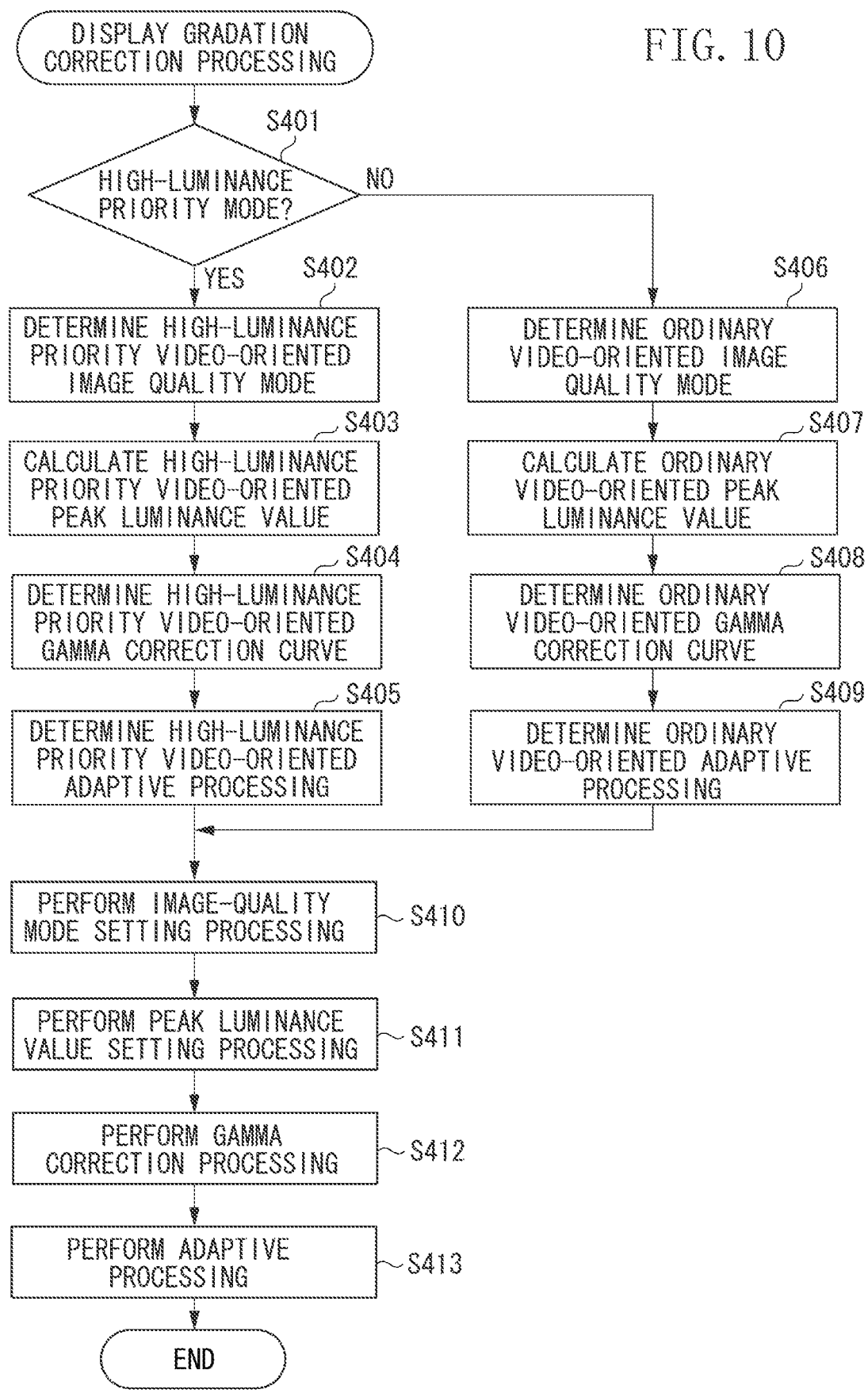
FIG. 10 is a flowchart illustrating a signal processing control performed by the display apparatus.

FIG. 10 is a flowchart illustrating exemplary processing performed by the display microcomputer 221 and the signal processing unit 222 in the display apparatus 220.

Each process of the flowchart illustrated in FIG. 10 is implemented by the display microcomputer 221 executing a video processing program dedicated to the display apparatus according to the present exemplary embodiment. The video processing program according to the present exemplary embodiment may be prepared beforehand in the ROM (not illustrated) of the display apparatus 220 or may be read from an external storage medium (not illustrated) and loaded into the RAM, or may be downloaded via an appropriate network.

The processing of the flowchart illustrated in FIG. 10 starts, for example, when a user operates the mode dial 126 of the video camera 120 to select the reproduction mode and operates the operation switch group 127 to start reproduction. If the processing of the flowchart illustrated in FIG. 10 starts, then in step S401, the display microcomputer 221 determines whether the video signal is a signal having been subjected to the gradation correction processing in the high-luminance priority mode with reference to the flag indicating the high-luminance priority mode (i.e., the metadata analysis result) or a user operation. If the display microcomputer 221 determines that the high-luminance priority mode flag is present (YES in step S401), the operation proceeds to step S402. On the other hand, if the display microcomputer 221 determines that the high-luminance priority mode flag is not present (NO in step S401), the operation proceeds to step S406.

When the operation proceeds to step S402, the display microcomputer 221 determines an image quality mode according to a user selection on the image-quality mode setting menu or an image quality mode suitable for the high-luminance priority mode. After completing the processing in step S402, the operation of the display microcomputer 221 proceeds to step S403. On the other hand, when the operation proceeds to step S406, the display microcomputer 221 determines an image quality mode according to a user selection on the image-quality mode setting menu or an image quality mode suitable for the ordinary imaging mode. Then, the display microcomputer 221 causes the image-quality mode setting unit 223 to perform image-quality mode setting processing according to the determined image quality mode. After completing the processing in step S406, the operation of the display microcomputer 221 proceeds to step S407.

When the operation proceeds to step S403, the display microcomputer 221 calculates a peak luminance value that equalizes the brightness of the video in the low/middle-luminance region with the corresponding brightness in the ordinary imaging mode, similar to the above-mentioned processing in step S202 illustrated in FIG. 8. After completing the processing in step S403, the operation of the display microcomputer 221 proceeds to step S404. On the other hand, when the operation proceeds to step S407, the display microcomputer 221 calculates a predetermined ordinary video-oriented peak luminance value, similar to the above-mentioned processing in step S203 illustrated in FIG. 8. After completing the processing in step S407, the operation of the display microcomputer 221 proceeds to step S408.

When the operation proceeds to step S404, the display microcomputer 221 determines a gamma correction curve that is closest to the inverse characteristic of the gamma characteristic 139 used by the imaging apparatus 100, similar to the above-mentioned processing in step S302 illustrated in the FIG. 9. After completing the processing in step S404, the operation of the display microcomputer 221 proceeds to step S405. On the other hand, when the operation proceeds to step S408, the display microcomputer 221 determines a predetermined ordinary video-oriented gamma correction curve, similar to the above-mentioned processing in step S303 illustrated in FIG. 9. After completing the processing in step S408, the operation of the display microcomputer 221 proceeds to step S409.

When the operation proceeds to step S405, the display microcomputer 221 determines adaptive processing to be applied to the video signal having been subjected to the gradation correction processing performed by the imaging apparatus 100 in the high-luminance priority mode. In other words, the display microcomputer 221 determines whether to perform the adaptive processing. After completing the processing in step S405, the operation of the display microcomputer 221 proceeds to step S410. On the other hand, when the operation proceeds to step S409, the display microcomputer 221 determines adaptive processing to be applied to the video signal having been subjected to the gradation correction processing performed by the imaging apparatus 100 in the ordinary imaging mode. After completing the processing in step S409, the operation of the display microcomputer 221 proceeds to step S410.

In step S410, the display microcomputer 221 causes the image-quality mode setting unit 223 to perform image-quality mode setting processing as mentioned above, in such a way as to set the image quality mode determined in step S405 or step S406. After completing the processing in step S410, the operation of the display microcomputer 221 proceeds to step S411.

In step S411, the display microcomputer 221 causes the peak luminance setting unit 224 to perform peak luminance value setting processing based on the peak luminance value determined in step S403 or step S407, similar to the above-mentioned processing in step S204 illustrated in the FIG. 8. After completing the processing in step S411, the operation of the display microcomputer 221 proceeds to step S412.

In step S412, the display microcomputer 221 causes the gamma correction processing unit 226 to perform gamma correction processing based on the gamma correction curve determined in step S404 or step S408, similar to the above-mentioned processing in step S304 illustrated in FIG. 9. After completing the processing in step S412, the operation of the display microcomputer 221 proceeds to step S413.

In step S413, the display microcomputer 221 causes the high-luminance adaptive processing unit 227 to perform adaptive processing as mentioned above based on the adaptive processing determined in step S405 or step S409. After completing the processing in step S413, the display microcomputer 221 repeats the processing of the flowchart illustrated in FIG. 10 until the power supply to the display apparatus 220 is stopped.

As mentioned above, according to the video processing system including the imaging apparatus 100 and the display apparatus 220 according to the present exemplary embodiment, it is feasible to reproduce natural gradation, color, and sharpness similar to the gradation characteristic of a real subject in the entire luminance region extending from lower luminance to higher luminance, while securing a practical input dynamic range.

As an example, exemplary processing for realizing the present invention includes supplying a program capable of realizing at least one of the functions described in the above-mentioned exemplary embodiments to a system or an apparatus via a network or an appropriate storage medium and causing at least one processor of a computer provided in the system or the apparatus to read and execute the program. Further, an appropriate circuit (e.g., ASIC) capable of realizing at least one of the above-mentioned functions is employable to realize the present invention.

The above-mentioned exemplary embodiments are mere examples capable of embodying the present invention and should not be referred to for the purpose of narrowly interpreting the technical range of the present invention. The present invention can be changed or modified in various ways without departing from the technical ideas or essential features of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214554, filed Oct. 30, 2015, which is hereby incorporated by reference herein in its entirety.

What is claimed is:

1. A video processing apparatus comprising:
at least one processor and/or circuit configured to function as following units,
a control unit configured to set a gamma characteristic for a second dynamic range larger than a first dynamic range, based on a referential gamma characteristic in which a relationship between a luminance input value and a luminance output value is predetermined in the entire luminance range of the first dynamic range; and
a correction unit configured to perform gamma correction processing on a video signal having the second dynamic range by using the set gamma characteristic,
wherein in a case where the correction unit performs the gamma correction processing based on the set gamma characteristic, a code of the input value, which is obtained by coding each luminance value of the captured video signal, is converted into a code of the output value, while a bit allocation rate of the output value code in an entire luminance region extending from lower luminance to higher luminance is not changed with respect to the referential gamma characteristic.

2. The video processing apparatus according to claim 1, wherein the gamma characteristic to be set by the control unit is a gamma characteristic of the second dynamic range that is larger by a predetermined magnification compared to the first dynamic range of the referential gamma characteristic.

3. The video processing apparatus according to claim 1, wherein the control unit is configured to add to the video signal having been subjected to the gamma correction processing, at least one of:
information indicating which of the first gamma characteristic and the second gamma characteristic has been used in the gamma correction processing,
information corresponding to a predetermined magnification in a case where the selected first or second gamma characteristic is a gamma characteristic of the second dynamic range that is larger by the predetermined magnification compared to the first dynamic range of the referential gamma characteristic,
information representing a peak luminance value of the video signal,
gamma shape information of the selected first or second gamma characteristic, and
information indicating the referential gamma characteristic, as metadata.

4. The video processing apparatus according to claim 1, further comprising a signal processing unit configured to output the video signal to a display or a computer readable storage medium.

5. A video processing method, comprising:
setting a gamma characteristic for a second dynamic range larger than a first dynamic range, based on a referential gamma characteristic in which a relationship between a luminance input value and a luminance output value is predetermined in the entire luminance range of the first dynamic range; and
performing gamma correction processing on a video signal having the second dynamic range by using the set gamma characteristic,
wherein in a case where the gamma correction processing is performed based on the set gamma characteristic, a code of the input value, which is obtained by coding each luminance value of the captured video signal, is converted into a code of the output value, while a bit allocation rate of the output value code in an entire luminance region extending from lower luminance to higher luminance is not changed with respect to the referential gamma characteristic.

6. A non-transitory computer readable medium storing a program that, when implemented by a video processing apparatus, causes the video processing apparatus to perform the method according to claim 5.

7. A video processing apparatus comprising:
at least one processor and/or circuit configured to function as following units,
a control unit configured to set a gamma characteristic for a second dynamic range larger than a first dynamic range, based on a referential gamma characteristic in which a relationship between a luminance input value and a luminance output value is predetermined in the entire luminance range of the first dynamic range;
a correction unit configured to perform gamma correction processing on a video signal having the second dynamic range by using the set gamma characteristic; and
wherein the control unit is configured to select, according to a mode of the apparatus, one of:
a first gamma characteristic, which is set according to the relationship between the input luminance value and the output luminance value of the referential gamma characteristic; and
a second gamma characteristic, which is set by compressing an output luminance value relative to an input luminance value in a high-luminance region, compared to the relationship between the input luminance value and the output luminance value of the referential gamma characteristic;

wherein the correction unit performs the gamma correction processing by using the first gamma characteristic or the second gamma characteristic selected according to the mode of the apparatus, wherein the control unit is configured to generate an exposure display signal to display a relationship between present exposure and appropriate exposure, as a positional relationship, when a live view display is performed by performing the gamma correction processing on a captured video signal, and wherein, in a case where the gamma correction processing is performed by using the first gamma characteristic, the control unit generates the exposure display signal in such a way as to set a position indicating the appropriate exposure based on luminance when the gamma correction processing is performed by using the first gamma characteristic.

8. A method for a video processing apparatus comprising:

setting a gamma characteristic for a second dynamic range larger than a first dynamic range, based on a referential gamma characteristic in which a relationship between a luminance input value and a luminance output value is predetermined in entire luminance range of the first dynamic range;

performing gamma correction processing on a video signal having the second dynamic range by using the set gamma characteristic; and wherein setting the gamma characteristic comprises selecting, according to a mode of the apparatus, one of:

a first gamma characteristic, which is set according to the relationship between the input luminance value and the output luminance value of the referential gamma characteristic; and a second gamma characteristic, which is set by compressing an output luminance value relative to an input luminance value in a high-luminance region, compared to the relationship between the input luminance value and the output luminance value of the referential gamma characteristic;

wherein performing the gamma correction processing comprises performing the gamma correction processing by using the first gamma characteristic or the second gamma characteristic selected according to the mode of the apparatus, wherein setting the gamma characteristic comprises generating an exposure display signal to display a relationship between present exposure and appropriate exposure, as a positional relationship, when a live view display is performed by performing the gamma correction processing on a captured video signal, and wherein, in a case where the gamma correction processing is performed by using the first gamma characteristic, setting the gamma characteristic comprises generating the exposure display signal in such a way as to set a position indicating the appropriate exposure based on luminance when the gamma correction processing is performed by using the first gamma characteristic.

* * * * *